United States Patent [19]

Meltz et al.

[11] Patent Number: 5,546,481
[45] Date of Patent: Aug. 13, 1996

[54] SINGLE POLARIZATION FIBER AND AMPLIFIER

[75] Inventors: Gerald Meltz, Avon; Gary A. Ball, Simsbury, both of Conn.

[73] Assignee: United Technologies Corporation, Hartford, Conn.

[21] Appl. No.: 397,467

[22] Filed: Mar. 2, 1995

[51] Int. Cl.$^6$ ........................................... G02B 6/00
[52] U.S. Cl. ............................... 385/11; 385/37
[58] Field of Search ..................... 385/11, 37; 372/6

[56] References Cited

U.S. PATENT DOCUMENTS

| | | | |
|---|---|---|---|
| 5,048,913 | 9/1991 | Glenn et al. | 385/37 |
| 5,237,576 | 8/1993 | DiGiovanni et al. | 372/6 |
| 5,243,609 | 9/1993 | Huber | 372/6 |

OTHER PUBLICATIONS

Optical Waveguide Theory, Allan W. Snyder and John D. Love, Jan. 1983, pp. 460–473, Chapter 22, "Nonuniform fibers".

Optical Society of America, Optical Fiber Communication Conference, Jan. 1990 Technical Digest Series, vol. 1, 22–26 Jan. 1990, G. Meltz et al., "In–fiber Bragg grating tap".

Primary Examiner—Rodney B. Bovernick
Assistant Examiner—Robert E. Wise
Attorney, Agent, or Firm—Gerald L. DePardo

[57] ABSTRACT

A single polarization fiber and/or amplifier includes a non-polarization preserving fiber 10 having a fiber grating tap 12 which has a predetermined length and strength ($\Delta n/n$) and is oriented at a predetermined angle $\theta$ and has a grating spacing D so as to couple-out of the fiber 10 a predetermined amount of one polarization 24 over a predetermined wavelength range of an input light 16 and pass the other polarization 28 as output light 26, the grating length being substantially the length of the fiber 10. Alternatively, all or a portion of the fiber 10 may be doped to form a polarization sensitive optical amplifier.

6 Claims, 2 Drawing Sheets fig. 3

SINGLE POLARIZATION FIBER AND
AMPLIFIER

CROSS REFERENCES TO RELATED
APPLICATIONS

Copending U.S. patent application, Ser. No. (UTC Docket No. R-3687), entitled, "Polarized Fiber Laser Source", filed contemporaneously herewith, contains subject matter related to that disclosed herein.

TECHNICAL FIELD

This invention relates to single polarization optical components and more particularly to single polarization fibers and amplifiers.

BACKGROUND ART

It is known in the art of fiber optics that a polarization preserving (or maintaining) fiber will maintain the polarization of light launched into one end such that the light exiting from an opposite end has substantially the same polarization as that which entered it. However, if an elliptically polarized or circularly polarized light enters a polarization maintaining fiber, the light that exits the fiber will be polarized along both orthogonal polarization modes corresponding to the input signal.

However, it would be desirable to obtain an optical fiber which receives randomly elliptically polarized input light and provides output light polarized only along a single polarization.

It is also known that a fiber optic amplifier may be made using polarization preserving fiber. However, such an amplifier has the same drawbacks as the aforementioned optical fiber when a randomly elliptically polarized input signal is incident thereon and the desired output signal is a singularly polarized signal.

Thus, it would be desired to provide an optical amplifier which provides an output signal polarized only along a single polarization mode.

DISCLOSURE OF INVENTION

Objects of the invention include provision of a single polarization optical fiber and/or amplifier which provides output light polarized substantially along a single polarization mode.

According to the present invention a single polarization device, comprises a non-polarization preserving solid optical waveguide which propagates light having polarization components along a first polarization mode and along a second polarization mode; a grating tap oriented at a predetermined angle, and having a predetermined grating spacing, grating length, and grating strength so as to couple-out of the waveguide a predetermined amount of the first polarization over a predetermined wavelength range and pass the second polarization as an output light from the waveguide, the output light being polarized substantially along the second polarization; and the grating length extending over substantially the entire length of the waveguide.

According further to the present invention, a portion of the waveguide is doped with a rare-earth dopant. According still further to the present invention, the rare-earth dopant comprises erbium.

The invention represents a significant improvement over the prior art by providing an optical fiber which only propagates a single polarization mode of light. In an alternative embodiment, all or a portion of the optical fiber may be doped with a rare-earth dopant to provide a polarization sensitive optical amplifier, thereby providing amplified optical output signal only along a single polarization mode.

The foregoing and other objects, features and advantages of the present invention will become more apparent in light of the following detailed description of exemplary embodiments thereof as illustrated in the accompanying drawings.

BRIEF DESCRIPTION OF DRAWINGS

FIG. 3 is a schematic block diagram of a single polarization optical fiber and amplifier, in accordance with the present invention.

BEST MODE FOR CARRYING OUT THE
INVENTION

Figure 1:
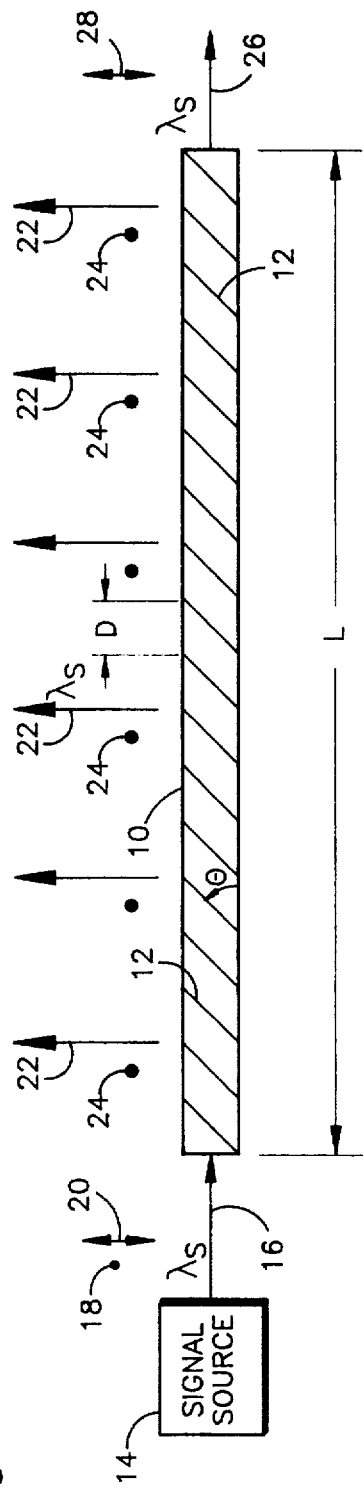
FIG. 1 is a schematic block diagram of a single polarization optical fiber in accordance with the present invention.

Referring to FIG. 1, a single polarization optical fiber comprises a predetermined length L of optical fiber 10, e.g., non polarization preserving optical fiber. The fiber has impressed therein a continuous slanted Bragg grating tap 12 having a predetermined angle θ with respect to a longitudinal axis of the fiber 10 and a predetermined spacing D between peaks in the periodic perturbation of the refractive index of the optical core of the fiber 10.

An optical source 14 provides an optical output signal 16 which enters the fiber 10. The input signal 16 has a signal wavelength (or wavelength band) $\lambda_s$ and may be randomly elliptically polarized having polarization components along two orthogonal polarization axes (or states or modes) as indicated by a dot 18 and a line 20 corresponding to, e.g., the "S" and "P" polarizations, respectively.

The spacing D of the grating 12 is set so as to reflect the wavelength $\lambda_s$ (or wavelength band) of the input signal out of the fiber 10, as indicated by lines 22. Also, the angle θ of the grating 12 is set at the Brewster wavelength angle (discussed hereinafter), such that only (or primarily) light of one polarization, e.g., dot or "S" polarization, is coupled out of the fiber, as indicated by dots 24. Accordingly, light 26 which passes through the slanted grating tap 12 and exits the fiber 10 has a preferential polarization along the "P" polarization state, as indicated by a line 28.

The percentage of the light 16 along the dot (or "S") polarization axis to be coupled-out of the fiber by the grating tap 12 is determined by the following relationship:

$$P_1 = P_0 \exp(-\gamma_{s,p} * l) \qquad \text{[Eq. 1]}$$

or in terms of dB:

$$10 \log(P_1/P_0) = 4.343(-\gamma_{s,p} * l) \qquad \text{[Eq. 2]}$$

where $P_1$ is the power of the transmitted light (for a given polarization state) that passes through the grating tap, $P_0$ is the power of the incident light (for a given polarization state), $\gamma_{s,p}$ is the fraction of light for a given polarization state coupled-out of the fiber per unit length of fiber grating tap (i.e., the loss per unit length), and $l$ is the longitudinal length of the fiber grating tap.

The value for $\gamma_{s,p}$ is a function of $\Delta n$ (peak refractive index change of the grating), d (diameter of fiber core), NA (numerical aperture between core and cladding), and $\lambda_o$ (wavelength of the incident light). For an Accutether® fiber having a core diameter d of 4.902 ram, a numerical aperture NA of 0.196, a grating $\Delta n$ of $5.84 \times 10^{-3}$, and an average refractive index of 1.46 (giving a grating fractional index change or "strength" of $\Delta n/n = 0.004$ or 0.4%), the values for $\gamma_s$ and $\gamma_p$ are:

$\gamma_s = 0.225537$ mm$^1$ (for the tapped-out "S" polarization); and $\gamma_p = 2.57669 \times 10^{-3}$ mm$^1$ (for the un-tapped "P" polarization).

These values of $\gamma_s$ and $\gamma_p$ may be determined by modeling the grating tap as an optical phased array, or may alternatively be derived from optical mode coupling theory, such as that described in the text: A. Snyder et al, "Optical Waveguide Theory", Publ. Chapman and Hall Ltd, ISBN 0,412,24250,8 (1983). Also, the value of the loss $\gamma$ is proportional to $(\Delta n)^2$ for both "S" and "P" polarizations.

Thus, to provide a high percentage of polarization rejection, e.g., about 99.9%, of the "S" polarization over the "P" polarization the length of the grating tap can be calculated as follows.

$$P_p32 \, P_{op} \exp(-\gamma_p * 1) \quad \text{[Eq. 3]}$$

$$P_s32 \, P_{os} \exp(-\gamma_s * 1) \quad \text{[Eq. 4]}$$

taking the ratio of $P_p$ to $P_s$ gives:

$$10 \log (P_p/P_s) = 4.343(\gamma_s - \gamma_p)1 \quad \text{[Eq. 5]}$$

and $P_p/P_s = 1000$ (i.e., 1/.001); thus $1 = 31.06$ mm or 3.1 cm.

Therefore, the length 1 of the grating tap should be about 3.1 cm for a grating having a $\Delta n/n$ of 0.4% (which is typically considered a "strong" grating). Other grating lengths 1 and fractional index changes $\Delta n/n$ may be used if desired. As indicated in Eq. 1, the longer the grating length 1, the more light that is tapped out of the fiber. Also, the "stronger" the grating (i.e., the larger the fractional index change $\Delta n/n$), the more light that is tapped out. Further, as discussed hereinbefore, the fractional loss $\gamma$ is proportional to the square of the refractive index change $(\Delta n)^2$ for the grating. Thus, for short fibers, a strong grating may be needed to provide the desired polarization rejection.

Regarding polarization sensitivity and the angle $\theta$ of the grating 12, it is known that a short slanted grating tap exhibits polarization sensitive reflection as is discussed in the article: G. Meltz et al, "In-fiber Bragg Grating Tap", Optical Fiber Communication Conference, 1990 Technical Digest Series, Vol. 1 (Jan. 1990). In that article, a short (5 mm) grating tap was formed in a polarization maintaining fiber to illustrate this principle. It is also known that the sensitivity of the slanted grating tap 12 to the polarization of incident light is related to the optical theory on Brewster's angle.

In particular, the grating 12 reflects light polarized normal to the plane of incidence (or parallel to the reflecting surface of the tap, or "S" polarized in FIG. 1), independent of the angle of incidence. However, light polarized parallel to the plane of incidence (or normal to the reflecting surface, or "P" polarized in FIG. 1) and incident on the grating at the Brewster's angle, is transmitted with minimal reflection. Thus, the angle of the grating tap 12 should be set such that the light incident on the grating tap is incident on the tap at the Brewster's angle. The Brewster's angle for a small fractional refractive index change $(\Delta n/n)$ at the reflection interface, e.g., 0.05–0.1% (which is typical for a Bragg grating), is approximately 45 degrees; however, even for "strong" gratings (e.g., $\Delta n/n = 0.5\%+$) the angle is close to 45 degrees. More specifically, the known relationship for the Brewster's angle is:

$$\tan \theta_p = n_t/n_i \quad \text{[Eq. 6]}$$

where $\theta_p$ is the angle of incidence of the light incident on the tap, $n_t$ is the refractive index of the grating tap, and $n_i$ is the incident refractive index outside the grating tap. Thus, the grating tap 12 will typically be set at about 45 degrees from the longitudinal axis of the fiber so as to allow the tap to reflect only light polarized parallel to the reflecting surface of the grating tap. The angle $\theta$ of the grating tap 12 is related to the Brewster's angle by the relation: $\theta + \theta_p = 90$ degrees. Thus, the angle of the grating tap can be readily determined from the Brewster's angle. The angle of the tap (from Eq. 1) is based on the $\Delta n$ for the grating used.

Figure 2:
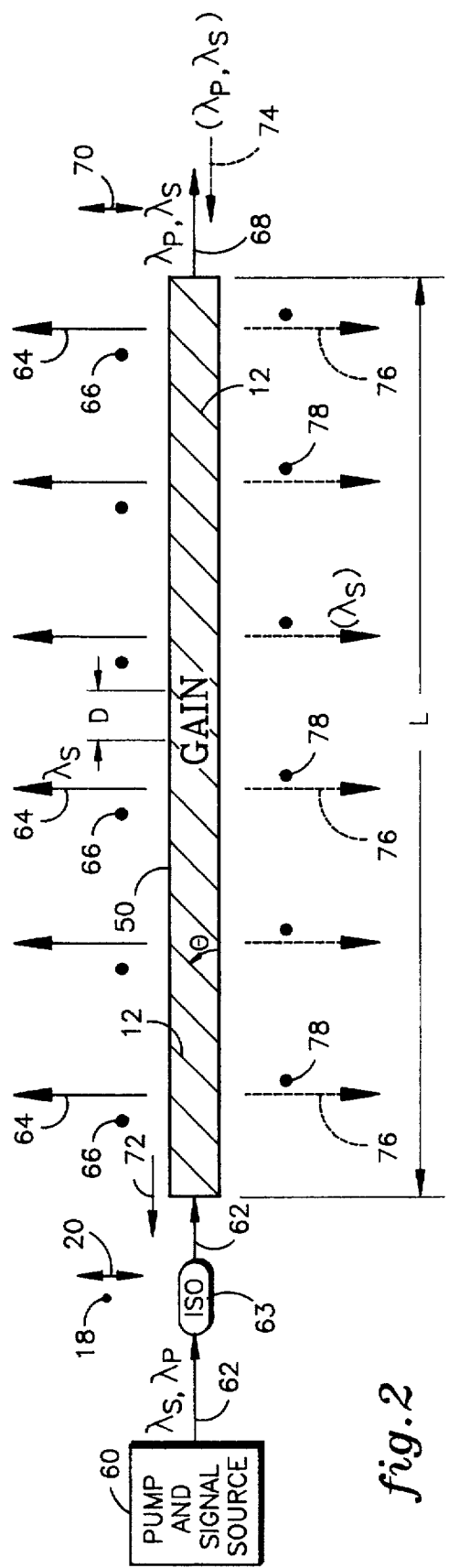
FIG. 2 is a schematic block diagram of a single polarization optical amplifier in accordance with the present invention.

Referring now to FIG. 2, a single polarization optical amplifier includes an optical fiber amplifier 50 having the slanted grating 12 impressed in the core thereof similar to that discussed hereinbefore with FIG. 1. The grating 12 has the predetermined angle $\theta$ with respect to the longitudinal axis of the fiber 80 and the predetermined spacing D between peaks in the periodic perturbation of the refractive index of the optical core. The fiber 50 is doped with a rare earth dopant, e.g., erbium, which acts as an optical gain or amplifying medium. All or a portion of the fiber 50 may be doped if desired.

The signal 62 passes through an optional optical isolator 63 which allows light to pass in only one direction (discussed more hereinafter). The light 62 then enters the optical fiber 50.

A pump and signal source 60 provides an output signal 62 having a pump wavelength $\lambda_p$ and an input signal wavelength $\lambda_s$. Alternatively, the source 60 may comprise a separate pump source (not shown) which provides an optical signal $\lambda_p$ and a separate input signal source (not shown) which provides an input optical signal having a wavelength $\lambda_s$, and both signals being coupled together to form the light 62.

The light 62 may be randomly elliptically polarized which can be decomposed along the two orthogonal polarizations as indicated by the dot 18 and the line 20, similar to that discussed hereinbefore with FIG. 1.

The angle $\theta$, the spacing D, the fractional index change (or strength; $\Delta n/n$), and the length of the grating tap 12 are set to reflect (or couple-out) a predetermined amount of one polarization, and a predetermined wavelength (or wavelength band), of the light 62 out of the fiber 50 amplifier, as indicated by lines 64, in a similar manner to that discussed hereinbefore with FIG. 1. The polarization of light which is coupled-out of the fiber amplifier 50 is indicated by dots 66.

As is known, in an optical amplifier, the pump wavelength $\lambda_p$ excites the rare-earth gain medium within the fiber 50 to an energy state which will cause the gain to exhibit stimulated emissions of photons at a predetermined wavelength or wavelength band. The rare-earth dopant should be designed so as to provide emissions having the same wavelength (or wavelength band) as the input signal $\lambda_s$, thereby providing optical amplification of the input signal portion of the signal 62 through optical amplifier by stimulated emissions from the gain medium which was excited by the pump wavelength $\lambda_p$. The amount of amplification that occurs, as is known, will be related to the length of the gain medium, the power of the pump, and the type of gain medium used. The amplifier can also be viewed as a broad-band super-fluorescent (or super-luminescent) source if only a pump signal and no input signal (to be amplified) is provided.

Because the grating tap 12 reflects one polarization, the other polarization passes through the grating tap 12 and travels along the doped fiber, stimulating more emissions along the length of the fiber amplifier 50 and ultimately exits the fiber 50 as indicated by a line 68, having one polarization, as indicted by a line 70, at the wavelength $\lambda_s$. There may also be some residual pump energy at the wavelength $\lambda_p$ in the output light 68 if the gain medium of the fiber 50 does not completely absorb the pump wavelength radiation.

Thus, as discussed hereinbefore with FIG. 1, the slanted grating 12 reflects or couples out a predetermined portion of the light at the signal wavelength along a predetermined polarization. Accordingly, the amplifier of FIG. 2 provides a substantially single polarization output signal 68 when the input signal 62 is randomly elliptically polarized, depending on the length 1 and strength ($\Delta n/n$) of the grating tap, as discussed hereinbefore.

The optical amplifier 50, as is known, emits light from both ends of the amplifier 50 as indicated by the line 68 and a line 72. As such, the isolator 63 prevents the amplified light 72 from entering and disrupting the operation of the pump and/or signal source 60. However, the isolator is not required if the source 60 has adequate isolation from external light.

Also, it should be understood that the amplifier 50 may be pumped from both ends of the fiber instead of only one end, as indicated by a dashed line 74. In that case, light will also be tapped out of the fiber as indicated by dashed lines 76 having a polarization indicated by dots 78. Also, in that case, the output amplified light may be extracted by a coupler or beam splitter (not shown). Also, it should be understood that instead of tapping out the dot ("S") polarization and passing the line ("P") polarization, the invention may instead tap out the line ("P") polarization and pass the dot ("S") polarization.

Additionally, because an optical amplifier may be used to amplify broadband light, and because the grating tap 12 may be designed with a grating spacing D so as to couple out a broad wavelength band, the amplifier of the present invention may also be used as a broad-band polarization sensitive amplifier. In particular, as is known, the grating spacing D is related to the reflection wavelength of a Bragg grating. More specifically, the larger the spacing the broader the wavelength reflectivity profile. Thus, by increasing the grating spacing D the polarization sensitive wavelength band of the amplifier is increased. However, if only a pump input signal is provided, the output light will be solely generated by emissions from the gain medium, and an broadband incoherent super-fluorescent (or super-luminescent) source is provided.

Figure 3:
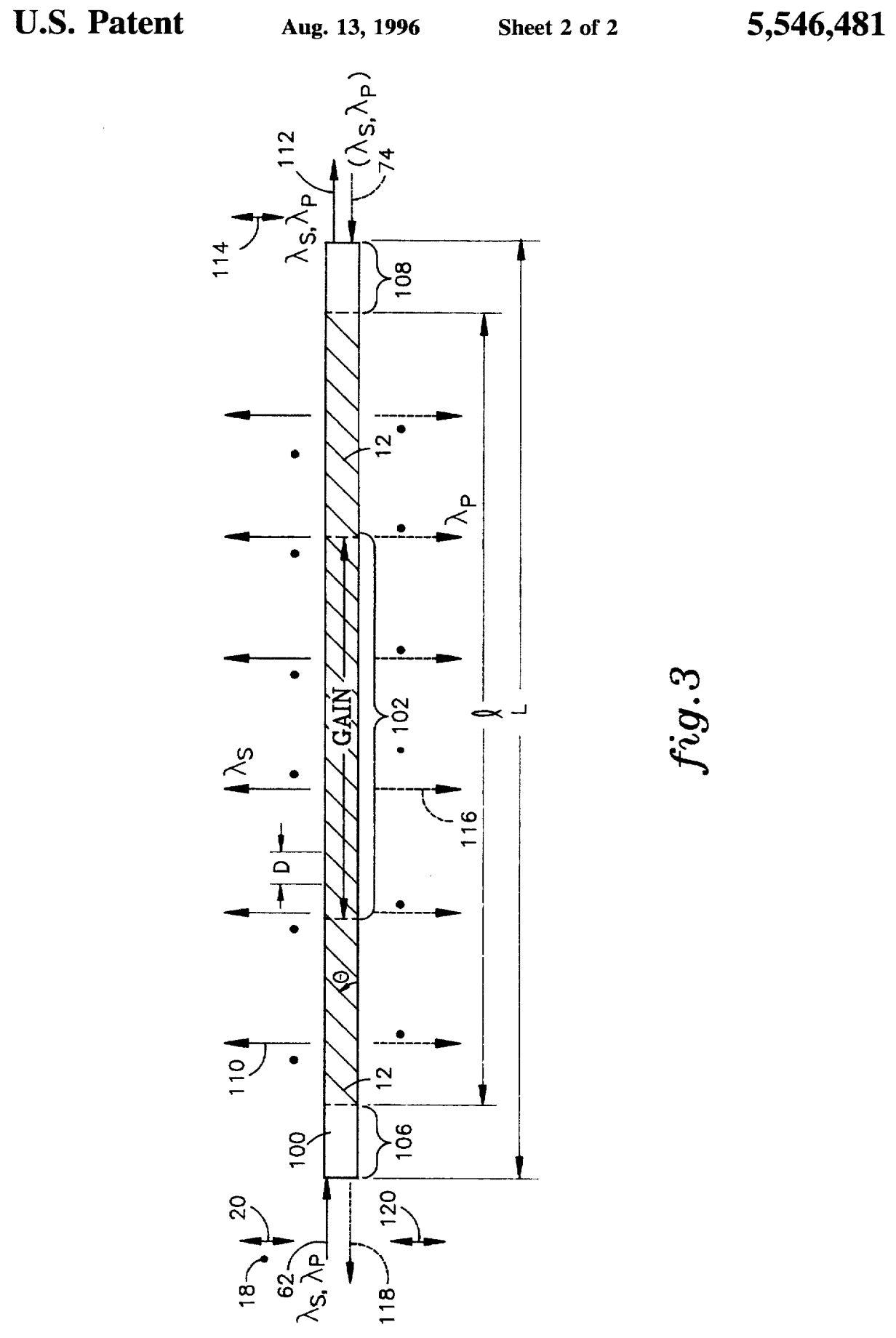

Referring to FIG. 3, in a single polarization fiber and amplifier embodiment of the present invention, the grating tap 12 extends a predetermined length 1 along an optical fiber 100, similar to the fiber 10 (FIG. 1) and provides polarization sensitive light propagation, as discussed hereinbefore with FIG. 1. A region 102 of the fiber 100 is doped with a rare-earth dopant, e.g., erbuim, similar to the doped fiber 50 (FIG. 2), which provides polarization sensitive light amplification of the input wavelength $\lambda_s$ when excited or pumped by a pump wavelength $\lambda_p$, as discussed hereinbefore with FIG. 2. A portion of the input light 62 along the "S" or dot polarization over a predetermined wavelength band is tapped out of the fiber 100, as indicated by line 110. The light which is passed by the grating (and amplified by the gain, if used), is indicated by a line 112, having substantially a single a polarization 114. Symmetrically, if the input light 74 enters the fiber 100 from the right side a portion of the light 74 along the "S" or dot polarization over a predetermined wavelength band is tapped out of the fiber 100, as indicated by lines 116. The light which is passed by the grating 12 (and amplified by the gain 102, if used), is indicated by a line 116, having substantially a single a polarization 120.

The fiber 100 may have two regions 106,108 at either end of the fiber which does not have the grating 12 impressed therein. The maximum allowable length of fiber regions 106,108 without the grating tap 12 depends on the amount of birefringence in the fiber and the magnitude of environmental perturbations, e.g., bending, twisting, crimping, etc., along the fiber portion without the grating tap, which cause polarization coupling in a fiber, as is known in the art. However, for best performance, the grating tap 12 should extend along substantially the entire length of the fiber to ensure single polarization performance of the fiber and/or amplifier. Alternatively, there may be gaps along the grating tap 12 similar to the regions 106,108 which propagate light over a predetermined length but do not alter the polarization.

Alternatively, the embodiment of FIG. 3 need not have a gain region. In that case, the fiber 100 with the tap 12 would be solely a single polarization fiber without amplification. Further, alternatively, in the embodiment of FIG. 3 the gain region 102 may extend over the entire length 1 of the grating 12.

Furthermore, the invention does not require the use of polarization preserving (or maintaining) fiber because the grating 12 either extends over the entire length of the fibers 10,50 (as shown in FIGS. 1 and 2, respectively), or extends for at least a sufficient length so as to provide a predetermined amount of polarization rejection and the remaining fiber being short enough so as not to allow polarization crossover, crosstalk, or coupling between polarizations (as shown in FIG. 3).

It should be understood that the invention will work equally well with any solid optical waveguide, e.g., a planar rib or channel optical waveguide instead of an optical fiber.

Also, the fibers 10,50 may be made of a fiber having more than one spatial mode (i.e., a multispatial mode fiber). In that case, the polarization of light propagating along each mode may be coupled out of the fiber by one or more slanted grating taps (depending on the magnitude of the difference between the optical frequency associated with each spatial mode and the bandwidth of the grating tap), in a manner similar to that described in U.S. Pat. No. 5,048,193, entitled "Optical Waveguide Embedded Transverse Spatial Mode Discrimination Filter", to Meltz et al.

Although the invention has been described and illustrated with respect to the exemplary embodiments thereof, it should be understood by those skilled in the art that the foregoing and various other changes, omissions and additions may be made without departing from the spirit and scope of the invention.

What is claimed is:

1. A single polarization device, comprising:

a non-polarization preserving solid optical waveguide which propagates light having polarization components along a first polarization mode and along a second polarization mode;

a grating tap oriented at a predetermined angle, and having a predetermined grating spacing, grating length, and grating strength so as to couple-out of said waveguide a predetermined amount of said first polarization over a predetermined wavelength range and pass said second polarization as an output light from said waveguide, said output light being polarized substantially along said second polarization; and said grating length extending over substantially the entire length of said waveguide.

2. The single polarization device of claim 1 wherein a portion of said waveguide comprises a gain medium.

3. The single polarization device of claim 2 wherein said gain medium comprises a rare-earth dopant.

4. The single polarization device of claim 1 wherein said waveguide comprises an optical fiber.

5. The single polarization device of claim 1 further comprising a pump signal within said waveguide which excites said gain medium, said gain medium emitting said light in said waveguide.

6. The single polarization device of claim 5 wherein said light emitted from said gain medium is broadband light.

* * * * *